United States Patent [19]

Burow et al.

[11] Patent Number: 5,059,250

[45] Date of Patent: Oct. 22, 1991

[54] RED IRON OXIDE PIGMENTS WITH IMPROVED COLORING PROPERTIES

[75] Inventors: Wilfried Burow; Horst Brunn; Peter Kresse; Hans Sander, all of Krefeld, Fed. Rep. of Germany

[73] Assignee: Bayer Aktiengesellschaft, Leverkusen, Fed. Rep. of Germany

[21] Appl. No.: 842,905

[22] Filed: Mar. 24, 1986

[30] Foreign Application Priority Data

Apr. 3, 1985 [DE] Fed. Rep. of Germany ....... 3512124

[51] Int. Cl.$^5$ ................................................ C09C 1/22
[52] U.S. Cl. ..................................... 106/459; 106/456
[58] Field of Search ......................... 106/304, 459, 456

[56] References Cited

U.S. PATENT DOCUMENTS 4,373,963 2/1983 Uenishi et al. ...................... 106/304
4,443,264 4/1984 Hund et al. ......................... 106/304

FOREIGN PATENT DOCUMENTS 0221473 5/1987 European Pat. Off. .
2075544 10/1971 France .

OTHER PUBLICATIONS

Kittaka, S., "J. Coll. and Interf. Sci.," 48, (1974) pp. 327-333.
Kittaka, S. and Morimoto, T., "J. Coll. and Int. Sci.," 75, (1980), pp. 398-403.
G. A. Parks, "The Isometric Point of Solid Oxides, Solid Hydroxides and Aqueous Hydroxo-Complex Systems, *Chem. Rev.*", 1965, 65.
H. Wagner, *Pigments*, p. 95, Stuttgart, West Germany, 1960.
H. Kittle, *Farben-Lack- und Kunststuff-Lexikon*, p. 380, Stuttgart, West Germany.
T. C. Patton, *Pigment Handbook*, vol. 1, pp. 329 and 347, N.Y., New York, 1974.

*Primary Examiner*—Amelia Burgess Yarbrough
*Attorney, Agent, or Firm*—Connolly and Hutz

[57] ABSTRACT

Red iron oxide pigments with improved coloring properties wherein the isoelectric point of the pigments is greater than 7.

6 Claims, No Drawings

RED IRON OXIDE PIGMENTS WITH IMPROVED COLORING PROPERTIES

This invention relates to new red iron oxide pigments with improved coloring properties, a process for the production of these pigments and the use thereof.

BACKGROUND OF THE INVENTION

Red iron oxide pigments are used in the building material, plastics material and lacquer industries. Color-pure red iron oxide pigments with a distinct red tint are particularly desired for use in lacquer systems. The tint of the pigment is defined in the lacquer according to DIN 6174 (equivalent ISO/DIN 7724, 1-3 drafts). The saturation value $C^*$ determined in the lacquer is valid as a measure for the color purity of the red iron oxide pigment, and the value $a^*$ determined in the lacquer is valid as a measure for the red tint.

When incorporating a red iron oxide pigment into various binder systems, it is observed that the saturation value $C^*$ and the value $a^*$ of the pigments decrease in numerous binder systems. The pigment grindings in such binder systems are thus substantially more unsaturated.

The pigments lose color purity in numerous binder systems independently and regardless of the process of production of red iron oxide pigments (e.g. by thorough roasting of iron sulphate or by poor annealing of $\alpha$-FeOOH or $Fe_3O_4$, which have been obtained by the precipitation route or aniline route or by production of direct red; Ullmann, volume 18, p. 601-603, 4th edition, Weinheim, 1979).

The object of the present invention is thus to provide red iron oxide pigments which do not suffer from the disadvantages described above.

BRIEF DESCRIPTION OF THE INVENTION

It has surprisingly now been found that the demands of such red iron oxide pigments can be met, if the value of the isoelectric point (iep) of the red pigments is greater than 7. The isoelectric points of commercial red iron oxide pigments have values of less than 7 (see Table 4).

DETAILED DESCRIPTION

The present invention thus provides red iron oxide pigments with improved coloring properties, wherein the isoelectric point of the pigments is greater than 7, particularly preferably greater than 8.

The isoelectric points of pigments can be determined by electrophoretic measurements [Thomas M. Riddick, "Control of Colloid stability through Zeta Potential", 1968, New York].

The measurement is carried out in this method in highly diluted solutions (0.001 g of pigment in 50 ml of solution of $10^{-3}$ mol $dm^{-3}$ of $KNO_3$). The electrophoretic mobility in $\mu$/s per V/cm is measured with a PEN KEM-system 3000 measuring instrument manufactured by PEN KEM Inc., Bedford Hills, New York, in a range of from pH 1 to 14, the pH of the solution being in each case adjusted with $HNO_3$, NaOH. The electrophoretic mobility is graphically plotted as a function of the pH. The point of intersection of this curve with the pH axis is defined as the isoelectric point.

It has furthermore been found that those red iron oxide pigments of which the pigment surfaces contain compounds of the elements of the group Mg, Zn, Al, La, Y, Zr, Sn, and Ca, have isoelectric points of above 7. For coloring reasons, these should be naturally colorless. Pigments according to the invention are thus those which have a coating which consists of colorless compounds of one or more of the group Mg, Zn, Al, La, Y, Zr, Sn, Ca. Thoroughly doped pigments are likewise useful, but a coating is preferable for cost reasons.

The pigments according to the invention have favorable coloring properties in all binders. Easily available compounds are naturally advantageous for the coating. Thus, particularly preferred red iron oxide pigments are those whose coating is one or more unsoluble compounds of Mg, Ca, Al and/or Zn.

The nature of the coated red iron oxide pigment, whether it is a thoroughly roasted or poorly annealed red iron oxide, is unimportant. In each case the coated red iron oxide pigments according to the invention have the necessary favorable coloring properties in all binder systems.

The named coating elements are effective preferably in quantities of from 0.5 to 10 mol %. In their preferred embodiment, the quantity of the coating elements of the group Mg, Zn, Al, Lá, Y, Zr, Sn, Ca is from 0.5 to 10 mol %, based on the total iron content of the red iron oxide pigments.

The present invention also provides a process for the production of the pigments according to the invention.

The coating of the iron oxide pigments can be an individual component or a mixed compound of the group Mg, Zn, Al, Ca, La, Y, Zr, Sn. All processes can be used for coating which result in a difficulty soluble coating of compounds of the named elements on iron oxide pigments. Included among these methods are grinding, precipitating or injecting the named compounds on iron oxide pigments.

The production of the pigments according to the invention advantageously takes place in such a way that the coating of the colorless compounds of one or more elements of the group Mg, Zn, Al, La, Y, Zr, Sn, Ca on red iron oxide pigments is carried out by injecting, grinding and/or precipitating such that the content of elements of the group Mg, Zn, La, Y, Zr, Sn, Ca is from 0.5 to 10 mol %, based on the total iron content of the red iron oxide pigments.

Production is particularly simply carried out by applying the coating by dry or wet grinding. If coating takes place by precipitation, then water-soluble Mg, Zn, Al, Ca, La, Y, Zr, Sn compounds are used initially and then precipitated on the pigment as difficultly soluble compounds in an aqueous iron oxide suspension, for example as oxide or mixed oxide. The coating can also be other difficultly soluble compounds, for example carbonates, phosphates, oxide hydroxides, etc., as long as they raise the isoelectric point of the red iron oxide pigment in the range greater than 7.

A further embodiment of the process according to the invention thus lies in that coating takes place by precipitating to form difficultly soluble colorless compounds.

Owing to their excellent properties, the red iron oxide pigments according to the invention are outstandingly suitable for coloring various color systems. Those properties which are comparable in all binders are of particular advantage for achieving even coloring.

The invention thus also relates to the use of the red iron oxide pigments according to the invention for coloring lacquer systems, dispersions, plastics materials and building materials.

The invention is described below by means of the following non-limiting Examples.

EXAMPLE A

Solution I is added to an aqueous suspension of red iron oxide and solution II is metered in with stirring at X° C. over about 30 min. After metering in the solution II, the suspension is kept at X° C. for a further 30 min with stirring. The product is washed salt-free, dried and ground.

The Bayferrox ® 120N used below is a commercial product of Bayer AG as is Bayferrox ® 1120 Z. Pfizer RO 3097 is a commercial product of Pfizer. These are all red iron oxide pigments.

The coating processes can be seen in Table 1 and 2.

TABLE 1

| Example | red iron oxide suspension | solution I | solution II | X° C. |
|---|---|---|---|---|
| A 1 | 30 kg of Bayferrox ® 120 N in 100 l of water | 12 l of $Al_2(SO_4)_3$ solution with 16.94 g of Al/l | 12 l of sodium aluminate solution with 68 g/l of $Al_2O_3$ and 57.7 g/l $Na_2O$ | 25 |
| A 2 | 30 kg of Bayferrox ® 120 N in 100 l of water | 6 l of $Al_2(SO_4)_3$ solution with 16.94 g of Al/l | 6 l of sodium aluminate solution with 68 g/l of $Al_2O_3$ and 57.7 g/l of $Na_2O$ | 25 |
| A 3 | 500 g of Bayferrox ® 120 N in 1 l of water | 150 ml of solution with 223.7 g/l of $Al_2(SO_4)_3$ and 66.53 g/l of $ZnSO_4$ | 150 ml of 4.75 M NaOH | 25 |
| A 4 | 500 g of Bayferrox ® 120 N in 1 l of water | 150 ml of $ZnSO_4$ solution with 198 g/l of $ZnSO_4$ | 150 ml of 2.47 M NaOH | 25 |
| A 5 | 500 g of Bayferrox ® 120 N of 1 l of water | 150 ml of solution with 223.7 g/l of $Al_2(SO_4)_3$ and 99.36 g/l of $MgSO_4$ | 150 ml of 4.75 M NaOH | 25 |
| A 6 | 500 g of Bayferrox ® 120 N of 1 l of water | 150 ml of solution with 66.53 g/l of $ZnSO_4$ and 49.68 g/l of $MgSO_4$ | 150 ml of 1.65 M NaOH | 25 |
| A 7 | 500 g of Bayferrox ® 120 N in 1 l of water | 100 ml of $AlCl_3$ solution with 16.92 g/l of Al | 100 ml of sodium aluminate solution with 69.3 g/l of $Al_2O_3$ and 58.8 g/l of $Na_2O$ | 80 |
| A 8 | 500 g of red iron oxide[1] in 1 l of water | 100 ml of $Al_2(SO_4)_3$ solution with 16.94 g/l of Al | 100 ml of sodium aluminate solution of 69.3 g of $Al_2O_3$/l and 58.8 g of $Na_2O$/l | 25 |
| A 9 | 250 g of Pfizer RO 3097 in 500 ml of water | 73 ml of $Al_2(SO_4)_3$ solution with 103 g of $Al_2O_3$/l | 93.5 ml of 4.75 M NaOH | 25 |
| A 10 | 250 g of Bayferrox ® 1120 Z in 500 ml of water | 73 ml of $Al_2(SO_4)_3$ solution with 103 g of $Al_2O_3$/l | 93.5 ml of 4.75 M NaOH | 25 |

[1]note to Table 1, Example A 8: The red iron oxide, Example 8, was produced according to the following process: 1000 g of iron sulphate heptahydrate are decomposed in a muffle furnace at 800° C. The product is suspended, washed, dried and again annealed at 825° C. in the muffle furnace and subsequently ground.

EXAMPLE B

A mixture of red iron oxide and additive is ground in a swing disc mill.

TABLE 2

| Example | red iron oxide | additives |
|---|---|---|
| B 1 | 100 g of Bayferrox ® 120 N | 7.5 g of aluminium hydroxide |
| B 2 | 100 g of Bayferrox ® 120 N | 1 g of $Ca(OH)_2$ + 150 ml of water |

The coloring properties of the red iron oxide pigments, coated according to the invention, in binder systems can be seen in Table 3.

The coated red iron oxide pigments have clearly improved coloring properties in binder systems compared with their uncoated comparative samples, namely improved saturation C* and increased red content a*.

Table 3 contains the improvement of the coated pigments for two binding agent systems, in their saturation C* and their red tint a* in relation to their uncoated comparative samples.

TABLE 3

Improvement in the coloring properties of red iron oxide pigments.
color difference from grindings with uncoated pigment

| | CIELAB C/2 grd Binder system 1 | | 10% PVC (Pigment volume concentration) Binder system 2 | |
|---|---|---|---|---|
| Example | Δ C* | Δ a* | Δ C* | Δ a* |
| A 1 | 3.6 | 1.7 | 3.7 | 1.7 |
| A 2 | 3.3 | 1.5 | 1.9 | 0.7 |
| A 3 | 3.5 | 1.8 | 2.7 | 1.3 |
| A 4 | 3.9 | 2.1 | 2.3 | 1.1 |
| A 5 | 3.7 | 2.0 | 2.6 | 1.2 |
| A 6 | 3.6 | 1.9 | 2.1 | 1.0 |
| A 7 | | | 2.2 | 0.9 |
| A 8 | 3.9 | 2.2 | 0.6 | 0.6 |
| A 9 | 0.6 | 0.5 | 0.9 | 0.6 |
| A 10 | 5.9 | 3.3 | 2.9 | 0.9 |
| B 1 | 0.3 | 0.2 | 1.8 | 0.8 |
| B 2 | 2.2 | 1.1 | 0.6 | 0.3 |

Binder 1:
85% of Alkynol ® 1556, commercial product of Bayer AG,
Base: polyester
15% of Cymel ® 303, commercial product of Cyanamid C,
Base: hexamethoxymethylamine
Binder 2:
75% of Alkydal ® R 35, commercial product of Bayer AG,
Base: short oil alkyd resin
25% of Maprenal ® MF 650, commercial product of Hoechst AG,
Base: melamine resin

TABLE 4

Isoelectric points of red iron oxide pigments.

| commercial product | production process | isoelectric point (iep) |
|---|---|---|
| Bayferrox ® 105 M | poor annealing or iron oxide black | 4 |
| Bayferrox ® 120 | poor annealing or iron oxide black | 2 |
| Bayferrox ® 120 | poor annealing or iron oxide black | 2.2 |
| Pfizer R 1599 D | thorough roasting of iron sulphide | 5 |
| Pfizer RO 3097 | precipitation of direct red | 5 |

The Bayferrox types are commercial products of Bayer AG, the remaining two are supplied by Pfizer.

TABLE 5

Isoelectric points of red iron oxide pigments coated according to the invention.

| Example | isoelectric point (iep) |
|---|---|
| A 1 | 11 |
| A 2 | 8 |
| A 3 | 8.5 |

What is claimed is:

1. Red iron oxide pigments with improved coloring properties having a colorless coating of one or more compounds of magnesium, zinc, aluminum, lanthanum, yttrium, zirconium, tin or calcium wherein the isoelectric point of the pigments is greater than 7.

2. Red iron oxide pigments according to claim 1 wherein the coating is difficulty soluble compounds of magnesium, calcium, aluminum, zinc or mixtures thereof.

3. Red iron oxide pigments according to claim 1 wherein the quantity of magnesium, zinc, aluminum, lanthanum, yttrium, zirconium, tin or calcium is from 0.5 to 10 mol %, based on the total iron content of the red iron oxide pigments.

4. A process for the production of red iron oxide pigments with improved coloring properties, having the isoelectric point of the pigments greater than 7 and having a coating of colorless compounds of one or more of magnesium, zinc, aluminum, lanthanum, yttrium, zirconium, tin or calcium which comprises coating red iron oxide pigments with one or more compounds of magnesium, zinc, aluminum, lanthanum, yttrium, zirconium, tin or calcium in an amount from 0.5 to 10 mol %, based on the total iron content of the red iron oxide pigments.

5. A process according to claim 4, wherein the coating is applied by dry or wet grinding.

6. A process according to claim 4 wherein the coating takes place by precipitating said compounds to form difficulty soluble colorless compounds on the red iron oxide substrate.

* * * * *